United States Patent [19]

Fukui et al.

[11] 4,197,498
[45] Apr. 8, 1980

[54] REMOTE CONTROL SYSTEM IN A RADIO TRANSCEIVER

[75] Inventors: Kiyotake Fukui, Settsu; Tadafumi Nishimura, Takarazuka, both of Japan

[73] Assignee: Matsushita Electric Industrial Co., Ltd., Osaka, Japan

[21] Appl. No.: 855,903

[22] Filed: Nov. 29, 1977

[30] Foreign Application Priority Data

Dec. 7, 1976 [JP] Japan .................. 51 147438

[51] Int. Cl.$^2$ ............................................. H01B 1/38
[52] U.S. Cl. ........................................... 455/77; 455/78
[58] Field of Search ............... 325/15, 16, 21.25, 390, 325/417, 361, 459, 455, 453, 464, 465, 457; 340/309.1; 73/5; 235/1 03, 104, 117 A, 118, 144 R

[56] References Cited

U.S. PATENT DOCUMENTS

| 3,973,228 | 8/1976 | Mueller | 325/15 |
| 4,032,844 | 6/1977 | Imazeki | 325/15 |

Primary Examiner—Benedict V. Safourek
Assistant Examiner—Tommy P. Chin
Attorney, Agent, or Firm—Wenderoth, Lind & Ponack

[57] ABSTRACT

In a radio transceiver having a transceiver unit and a remote control unit, a remote control system in which the operation of the transceiver unit is controlled by control signals coupled synchronously from the remote control unit. The remote control unit has a volume control, a squelch level control, a transmit/receive control switch, a channel select code converter etc., and analog and digital switches for synchronously coupling the above signals. The transceiver unit is capable of transmitting/receiving a plurality of radio signals at preselected frequencies and the operation is controlled by signals regenerated synchronously from the control signals received from the remote control unit.

9 Claims, 6 Drawing Figures

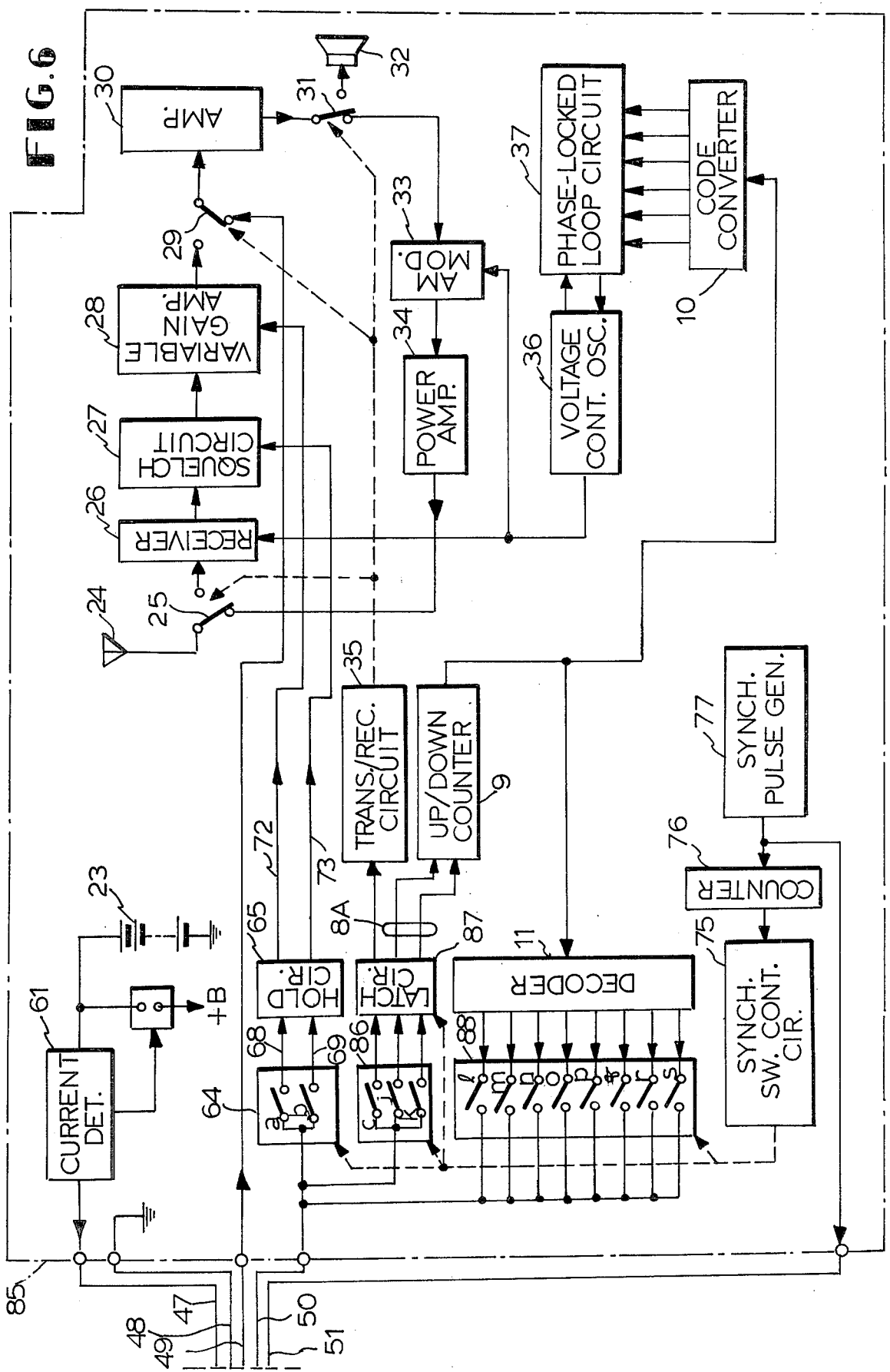

REMOTE CONTROL SYSTEM IN A RADIO TRANSCEIVER

BACKGROUND OF THE INVENTION

This invention generally relates to radio transceivers and, more particularly, to a remote control system in which a transceiver unit is controlled by control signals received from the remote control unit, using only a few electrical wires or cables between the remote control unit and the transceiver unit.

In a conventional remote control type transceiver, the remote control unit includes a microphone, a volume control means, a squelch control means, a transmit/receive switch means, a channel selection (up or down) switch, and a channel indicator. Therein, the remote control unit is coupled to the transceiver unit by a multi-conductor cable which conducts the respective signals or control signals.

While the above-described remote control type transceivers have been put to practical use for some applications, they have some disadvantages. One disadvantage is that many conductors are needed to couple the remote control unit to the transceiver unit. Therefore, the multi-conductor cable must be very thick and very heavy. It is inconvenient to operate such a remote control unit. Another disadvantage is that many connectors are needed to electrically connect the remote control unit or the transceiver unit to the multi-conductor cable, resulting in inefficiency in mass production of such systems and also resulting in poor reliability for such systems.

SUMMARY OF THE INVENTION

It is an object of this invention to provide a new and improved radio transceiver.

It is another object of this invention to provide such a transceiver which has a small and light remote control unit that is convenient to operate.

It is a further object of this invention to provide such a transceiver which is suitable for mass production and has good reliability.

BRIEF DESCRIPTION OF THE DRAWINGS

These and other objects and features and advantages of this invention will be apparent from considering the following description with the accompanying drawings, in which:

FIG. 6 is another circuit diagram of a basic circuit of a transceiver unit according to this invention.

DETAILED DESCRIPTION OF THE PREFERRED EMBODIMENTS

Figure 1:
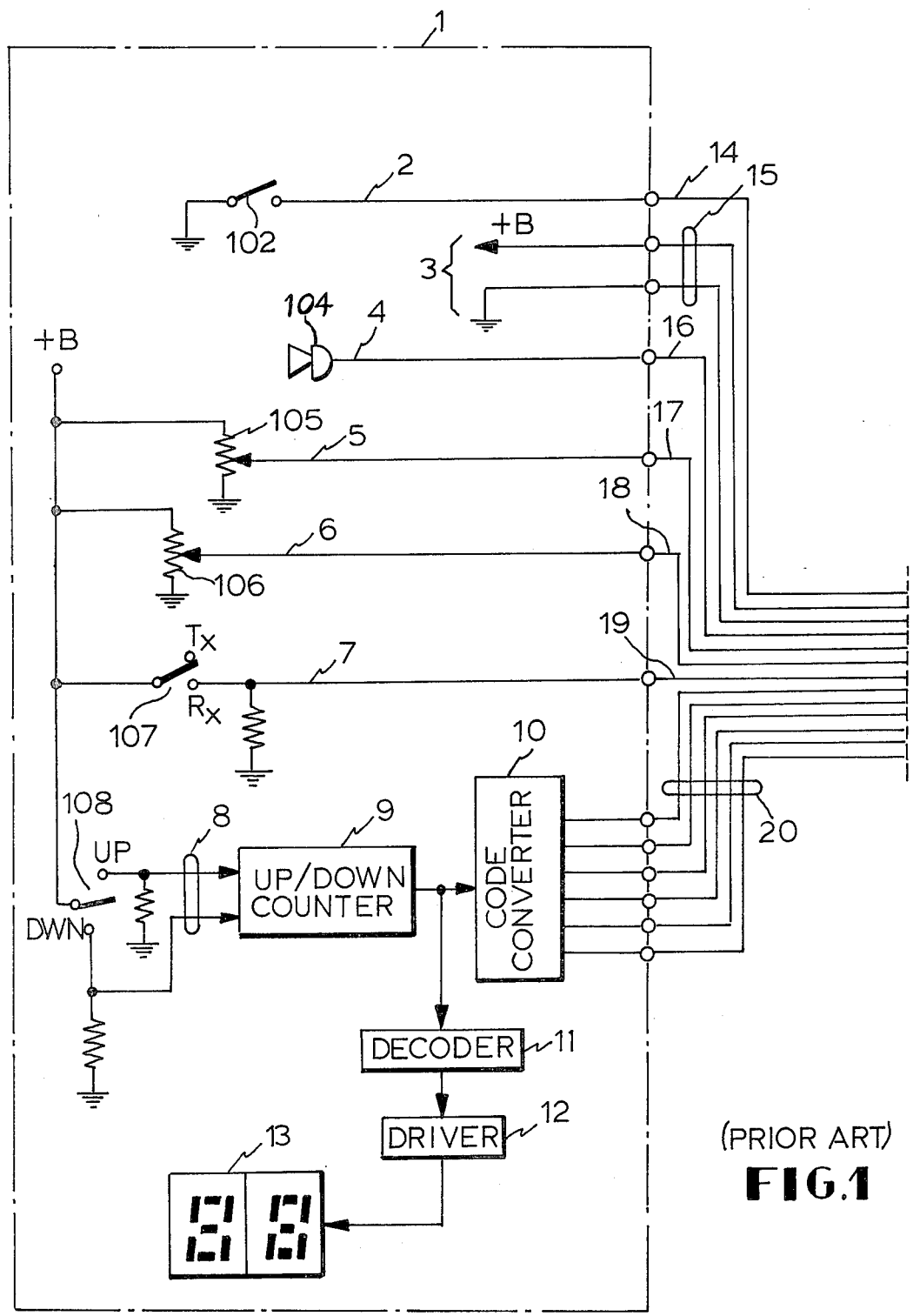
FIG. 1 is a basic schematic diagram of a remote control unit in a conventional remote control type radio transceiver.
Figure 2:
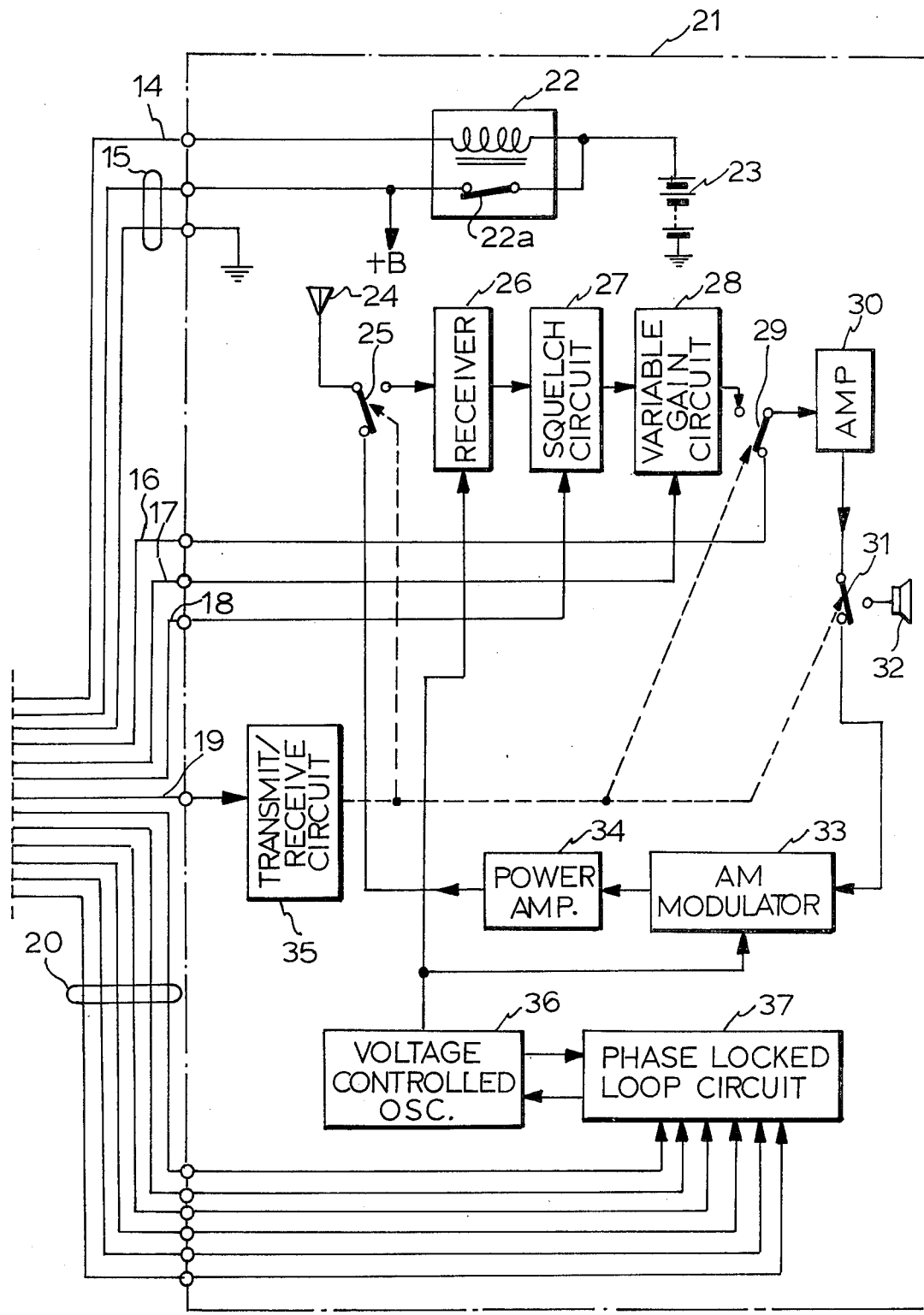
FIG. 2 is a basic schematic diagram of a transceiver unit in a conventional remote control type radio transceiver.

With reference to FIG. 1, there is shown a basic schematic diagram of a remote control unit 1 of a conventional remote control type radio transceiver. The remote control unit 1 is supplied with a power source 3 by a wire 15 from the transceiver unit, and provides, to the transceiver unit: a power ON/OFF control signal 2 from a power switch 102; an output signal 4 of a microphone 104; a control voltage 5 from a volume control potentiometer 105; a control voltage 6 from a squelch level control potentiometer 106; a transmit/receive control signal 7 from a switch 107; and output signals of a code converter 10 for controlling a phase locked loop (PLL) circuit 37 of the transceiver unit (FIG. 2). These signals are conducted by wires 14, 16, 17, 18, 19 and 20 respectively. The transceiver unit is controlled by these signals or control signals.

An up/down signal 8 from a channel select switch 108 is provided to an up/down counter 9 which is changed to a greater number or a lower number, step by step, in response to the up/down signal 8. The output of the up/down counter 9 is provided to a code converter 10 and is converted thereby to a preselected channel code for controlling the PLL circuit 37 of the transceiver unit (FIG. 2). The output of the up/down counter 9 is also used to drive a channel indicator 13 via a decoder 11 and a driver 12.

With respect to FIG. 2, there is shown a schematic circuit diagram for a transceiver unit 21 of a conventional remote control type radio transceiver type, in which the same reference numerals designate the same components as those of FIG. 1. A relay 22 is activated by the power ON/OFF control signal conducted by the wire 14 for turning on a power switch 22A. The power switch 22A supplies current from a power source 23 to all circuits of the transceiver unit 21. The microphone output signal 4 is conducted to a transmit/receive control switch 29 by the wire 16, and is amplified by an audio amplifier 30. A variable gain controlled amplifier 28 is controlled by the voltage from the wire 17. The operating level of a squelch circuit 27 is controlled by the voltage from the wire 18. A transmit/receive control circuit 35 is controlled by the transmit/receive control signal 7 conducted by the wire 19. The phase locked loop (PLL) circuit 37 which determines the transmit/receive channel frequencies is controlled by output signals of the code converter 10 conducted by the wire 20.

In FIG. 2, all of the circuits except the above-described circuitry may be the conventional and well known circuitry ordinarily employed in a transceiver. The elements of such conventional circuitry are an antenna 24, the transmit/receive control switches 25, 29, 31 controlled by the control circuit 35, a receiver unit 26, a speaker 32, an AM modulator 33, a power amplifier 34, a voltage controlled oscillator 36 controlled by the PLL circuit 37. The circuits are therefore not described in greater detail.

As mentioned above with reference to FIG. 1 and FIG. 2, each function of the transceiver unit is controlled by a signal conducted from the remote control unit 1 via the multi-conductor cable according to the prior art. Therefore, the multi-conductor cable is very thick, heavy and inflexible. Moreover, many connectors are needed to electrically connect the remote control unit 1 or the transceiver unit 21 to the multi-conductor cable, resulting in inefficient mass production of the systems and poor reliability for each system.

Figure 3:
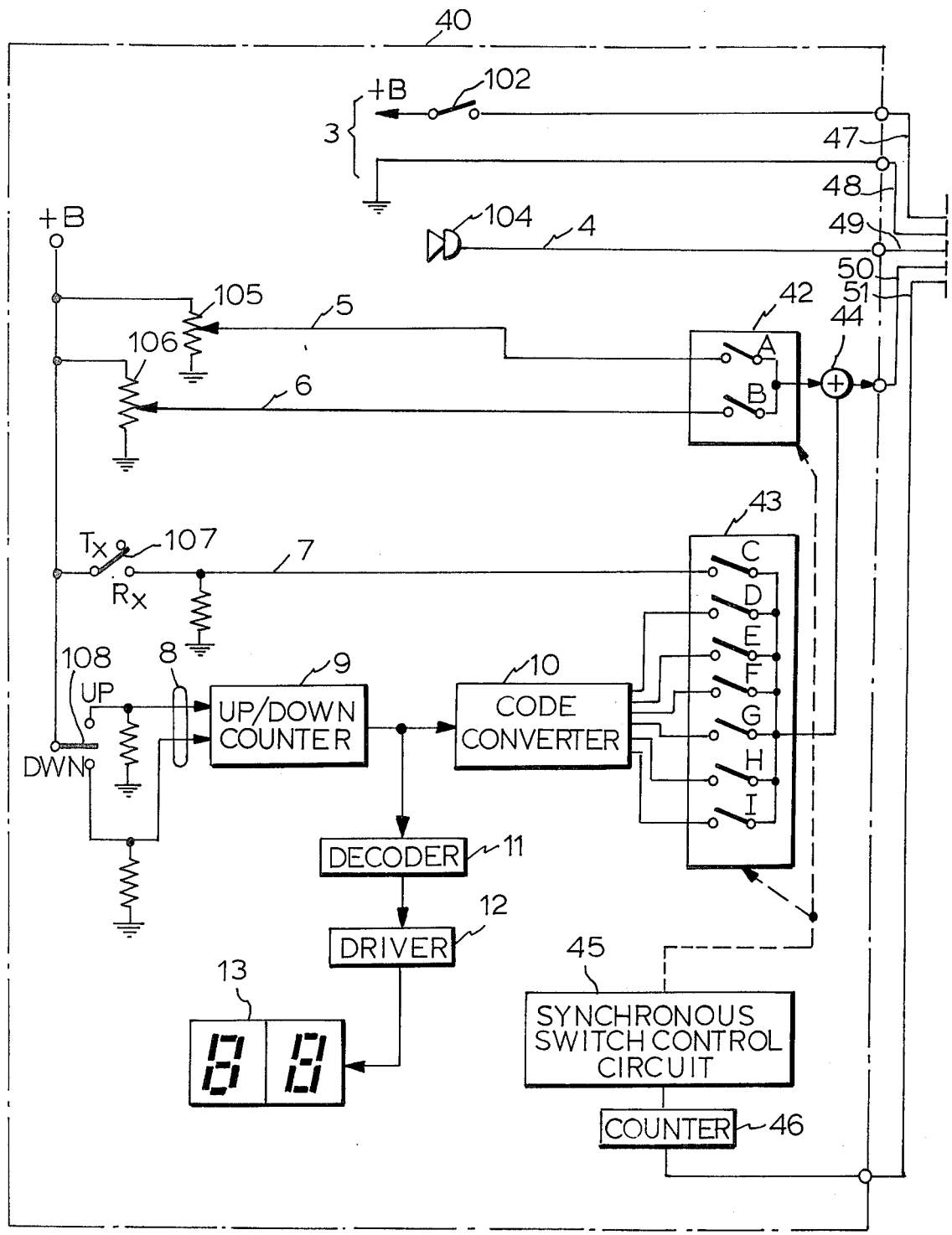
FIG. 3 is a circuit diagram of a basic circuit of a remote control unit in a radio transceiver according to this invention.
Figure 4:
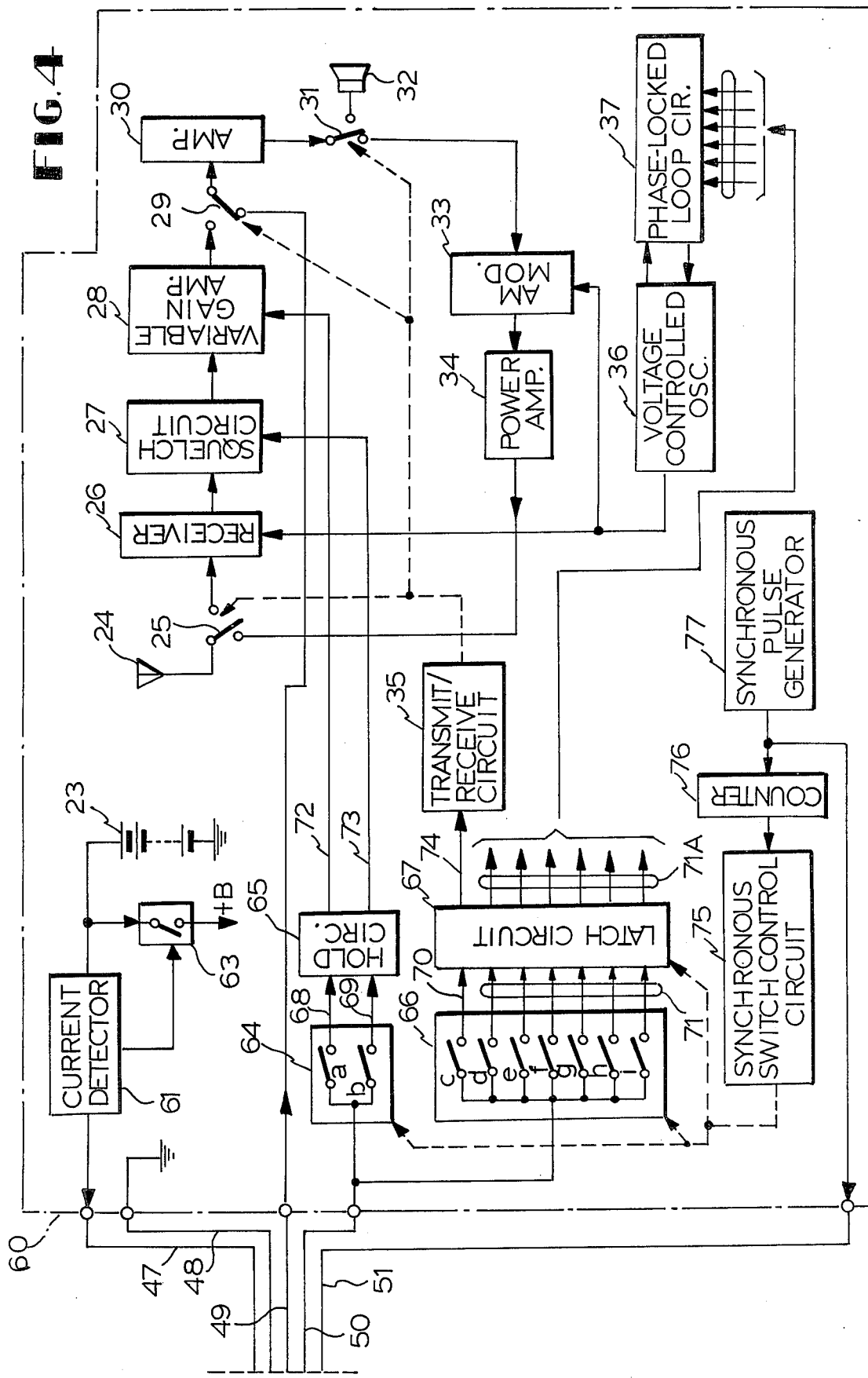
FIG. 4 is a circuit diagram of a basic circuit of a transceiver unit in a radio transceiver according to this invention.

This invention which will be described in detail below can make it possible to decrease the number conductors required in the multi-conductor cable and to eliminate many of the disadvantages mentioned above, improving the function and characteristics of a transceiver. Circuits according to one embodiment of this invention are shown in FIG. 3 and FIG. 4. A remote control unit 40 is shown in FIG. 3 and a transceiver unit 60 is shown in FIG. 4, in which the same reference numerals designate the same components as those of FIGS. 1 and 2, respectively.

In FIG. 3, a power source 3 of the remote control unit 40 is controlled by a power switch 102. The current increase which is generated at wire 47 by turning on the power switch 102 is detected by a current detector 61 in FIG. 4. A power switch 63 is activated by the current detector 61 and supplies current from a power source 23 to all circuits of the transceiver unit 60. The ground point of the remote control unit 40 is connected to the ground point of the transceiver unit 60 by a wire 48.

The output signal 4 of a microphone 104 is conducted to a transmit/receive switch 29 via a wire 49. A volume control voltage 5 and a squelch control voltage 6 are provided to an analog switch 42 which generates a linear output in proportion to an input thereof. A transmit/receive control signal 7 and the output signals of code converter 10 are provided to a digital switch 43 which generates a digital output in response to an input logic level. The outputs of the analog switch 42 and the digital switch 43 are added by an adder 44, and are conducted to an analog switch 64 and a digital switch 66 of the transceiver unit 60 via a wire 50. A counter 46 is driven by a synchronous pulse via a cable 51. This pulse is generated by a synchronous pulse generator 77. A synchronous switch control circuit 45 is driven by the counter 46 and controls the analog switch 42 and the digital switch 43.

In the transceiver unit 60, a counter 76 and a synchronous switch control circuit 75 operate synchronously with a synchronous pulse from the synchronous pulse generator 77, similarly to the counter 46 and the synchronous switch control circuit 45. That is, each switch (a...i) constituting the analog switch 64 and the digital switch 66 is made conductive synchronously when the corresponding switch (A...I) constituting the analog switch 42 and digital switch 43 is made conductive. Therefore, the control signals from the remote control unit 40 are conducted, in turn, to the transceiver unit 60, and thereby the output signals 68, 69 of the analog switch 64, and the output signals 70, 71 of the digital switch 66 are regenerated. These output signals 68 and 69 are stored in a hold circuit 65 and are used as a volume control voltage 72 and a squelch control voltage 73, respectively. Output signals 70 and 71 are provided to a latch circuit 67, and used as a transmit/receive control signal 74 and a PLL control signal 71A, respectively.

Figure 5:
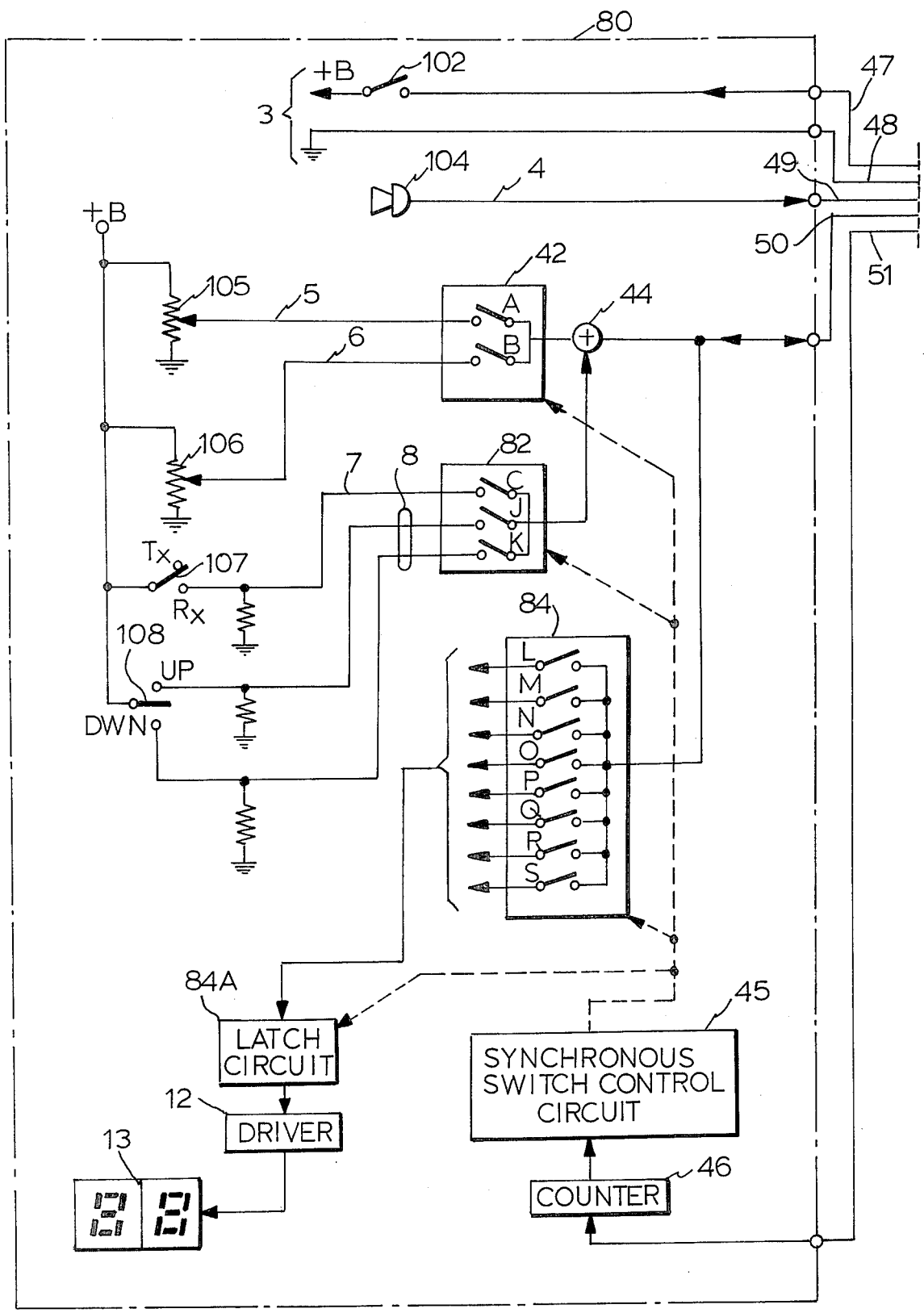
FIG. 5 is another circuit diagram of a basic circuit of a remote control unit according to this invention.

Although, in FIG. 3, the up/down counter 9, the code converter 10 and the decoder 11 are included in the remote control unit 40, these three elements may be included in the transceiver unit. This will be illustrated as follows. Thus, circuits according to another embodiment of this invention are shown in FIGS. 5 and 6. In FIG. 5, a remote control unit 80 is shown, and in FIG. 6, a transceiver unit 85 is shown, in which similar reference numerals designate similar components to those of the foregoing drawings.

A transmit/receive control signal 7 and an up/down signal 8 are provided to a digital switch 82, and are conducted to a digital switch 86 (FIG. 6) via an adder 44 and a wire 50, and are regenerated as output signals 74 and 8A from a latch circuit 87. The up/down signal 8A is provided to an up/down counter 9 connected to code converter 10. In addition, the output of the up/down counter 9 is decoded by a decoder 11. The outputs of the decoder 11 are switched by a digital switch 88 and are coupled synchronously in phase with the pulse of a synchronous pulse generator 77 to a digital switch 84 of the remote control unit 40 via the wire 50. The outputs of the digital switch 84 are memorized by a latch circuit 84A and are provided to a display driver 12. A channel indicator 13 (for example, 2 digits of 7 segment LED numeral display) is driven by the driver 12 and displays the channel number of the signal which the transceiver unit is transmitting or receiving. Just as in FIG. 3 and FIG. 4, the analog switches 42, 64 and the digital switches 82, 84, 86, 88 are controlled synchronously by the pulse of the synchronous pulse generator 77.

The advantage of this invention as illustrated in FIG. 5 and FIG. 6 is that the remote control unit can be made to be more compact because it requires fewer electrical components. Although specific preferred embodiments of this invention have been described and shown, it will be readily understood that modifications of this invention, in its various aspects, will be apparent to those skilled in the art, some being apparent only after study, and others being merely matters of routine design. As such, the scope of this invention should not be limited by the particular embodiments and specific constructions herein described, but should be defined only by the appended claims, and equivalents thereof.

What is claimed is:

1. A remote control system for a radio transceiver having a transceiver unit capable of transmitting and receiving radio signals at a plurality of preselected frequencies and a remote control unit including a plurality of control signal generating means for generating control signals for controlling the operation of said transceiver unit, said remote control system comprising:

a multiconductor cable connected to said transceiver unit and said remote control unit having a plurality of conductors for carrying signals between said transceiver unit and said remote control unit;

a first synchronous signal generating means located in said transceiver unit and connected to said multiconductor cable for generating a first synchronous signal;

a second synchronous signal generating means located in said remote control unit, connected to said multiconductor cable for receiving said first synchronous signal and for generating a second synchronous signal in phase with said first synchronous signal;

a first switch device located in said remote control unit, connected to said plurality of control signal generating means, said second synchronous signal generating means and said multiconductor cable, for conducting said control signals to said multiconductor cable one at a time in turn in synchronism with said second synchronous signal; and a second switch device located in said transceiver unit, connected to said multiconductor cable and said first synchronous signal generating means, for regenerating said control signals in synchronism with said first synchronous signal.

2. A remote control system as claimed in claim 1, in which each of said first and second switch devices is constituted by: an analog switch for processing an analog control voltage; and a digital switch for processing a digital control signal.

3. A remote control system as claimed in claim 2, in which each of said analog and digital switch of said first switch device is constituted by switches having a plurality of inputs and one output, and each of said analog switch and said digital switch of said second switch device is constituted by switches having one input and a plurality of outputs.

4. A remote control system for a radio transceiver having a transceiver unit capable of transmitting and receiving radio signals at a plurality of preselected frequencies and a remote control unit including a plurality of control signal generating means for generating control signals for controlling the operation of said transceiver unit, said remote control system comprising:

a multiconductor cable connected to said transceiver unit and said remote control unit having a plurality of conductors for carrying signals between said transceiver unit and said remote control unit;

a synchronous signal generating means for generating a synchronous signal;

a first switch device located in said remote control unit, connected to said plurality of control signal generating means, said synchronous signal generating means and said multiconductor cable, for conducting said control signals to said multiconductor cable one at a time in turn in synchronism with said synchronous signal;

a second switch device located in said transceiver unit, connected to said multiconductor cable and said synchronous signal generating means, for regenerating said control signals in synchronism with said synchronous signal;

an up/down counter located in said remote control unit, having an increment input and a decrement input, for storing a number, for increasing the value of said stored number by one upon receipt of a pulse on said increment input and for decreasing the value of said stored number by one upon receipt of a pulse on said decrement input;

an increment pulse generating means located in said remote control unit, connected to said increment input of said up/down counter for applying a pulse thereto under manual control;

a decrement pulse generating means located in said remote control unit, connected to said decrement input of said up/down counter for applying a pulse thereto under manual control;

a display means located in said remote control unit, connected to said up/down counter for displaying the number stored in said up/down counter;

a code converter located in said remote control unit, connected to said up/down counter for generating a plurality of frequency selection code signals corresponding to the number stored in said up/down counter;

a third switch device located in said remote control unit, connected to said code converter, said synchronous signal generating means and said multiconductor cable, for conducting said plurality of predetermined frequency code signals to said multiconductor cable one at a time in synchronism with said synchronous signal;

a fourth switch device located in said transceiver unit, connected to said multiconductor cable and said synchronous signal generating means, for regenerating said plurality of frequency selection code signals in synchronism with said synchronous signal;

a latch means located in said transceiver unit, connected to said fourth switch device for storing said plurality of frequency selection code signals; and a transceiver frequency selection means located in said transceiver unit, connected to said latch means for causing said transceiver to transmit and receive on one of said plurality of preselected frequencies corresponding to said plurality of frequency selection code signals.

5. A remote control system as claimed in claim 4, wherein each of said third and fourth switch devices is constituted by a digital switch.

6. A remote control system as claimed in claim 5, wherein said third switch device is constituted by switches having a plurality of inputs and one output, and said fourth switch device is constituted by switches having one input and a plurality of outputs.

7. A remote control system for a radio transceiver having a transceiver unit capable of transmitting and receiving radio signals at a plurality of preselected frequencies and a remote control unit including a plurality of control signal generating means for generating control signals for controlling the operation of said transceiver unit, said remote control system comprising;

a multiconductor cable connected to said transceiver unit and said remote control unit having a plurality of conductors for carrying signals between said transceiver unit and said remote control unit;

a synchronous signal generating means for generating a synchronous signal;

a first switch device located in said remote control unit, connected to said plurality of control signal generating means, said synchronous signal generating means and said multiconductor cable, for conducting said control signals to said multiconductor cable one at a time in turn in synchronism with said synchronous signal;

a second switch device located in said transceiver unit, connected to said multiconductor cable and said synchronous signal generating means, for regenerating said control signals in synchronism with said synchronous signal;

an up/down counter located in said transceiver unit, connected to said multiconductor cable, having an increment input and a decrement input, for storing a number, for increasing the value of the number by one upon receipt of a pulse on said increment input and for decreasing the value of the number by one upon receipt of a pulse on said decrement input;

said plurality of control signal generating means including an increment pulse generating means for generating a pulse under manual control;

said plurality of control signal generating means further including a decrement pulse generating means for generating a pulse under manual control;

said second switch device further comprising means to regenerate said pulse from said increment pulse generating means and applying the regenerated pulse to said increment input of said up/down converter and means to regenerate said pulse from said decrement pulse generating means and applying the regenerated pulse to said decrement input of said up/down converter;

a code converter located in said transceiver unit, connected to said up/down counter, for generating a plurality of frequency selection code signals corresponding to the number stored in said up/down counter;

a transceiver frequency selection means located in said transceiver unit, connected to said code converter, for causing said transceiver to transmit and receive on one of said plurality of preselected frequencies corresponding to said plurality of frequency selection code signals;

a decoder means located in said transceiver unit, connected to said up/down counter for converting the number stored in said up/down counter into a corresponding plurality of display signals;

a third switch device located in said transceiver unit, connected to said decoder means, said synchronous signal generating means and said multiconductor cable, for conducting said plurality of display signals to said multiconductor cable one at a time in synchronism with said synchronous signal;

a fourth switch device located in said remote control unit, connected to said multiconductor cable and said synchronous signal generating means, for regenerating said plurality of display signals in synchronism with said synchronous signal;

a latch means located in said remote control unit, connected to said fourth switch device for storing said plurality of display signals; and a display means, located in said remote control unit, connected to said latch means for displaying the number corresponding to said plurality of display signals.

8. A remote control system as claimed in claim 7, wherein each of said third and fourth switch devices is constituted by a digital switch.

9. A remote control system as claimed in claim 8, wherein said third switch device is constituted by switches having a plurality of inputs and one output, and said fourth switch device is constituted by switches having one input and a plurality of outputs.

* * * * *